July 26, 1938.     B. S. WATLING     2,124,838
COIN CONTROLLED AMUSEMENT APPARATUS
Filed April 30, 1938     3 Sheets-Sheet 1
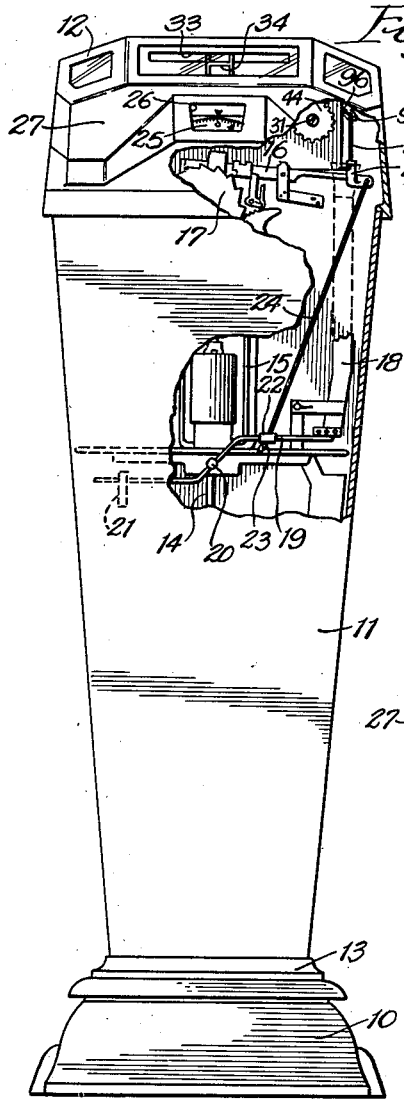
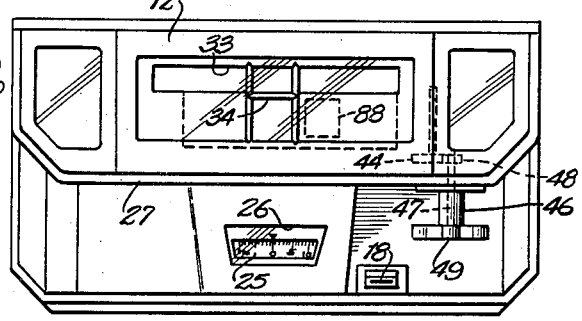
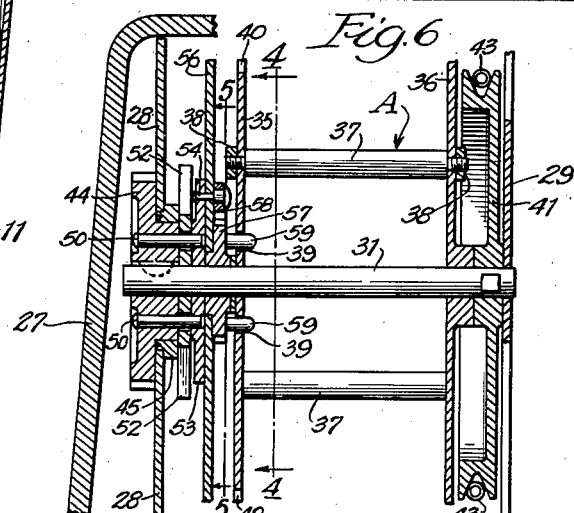
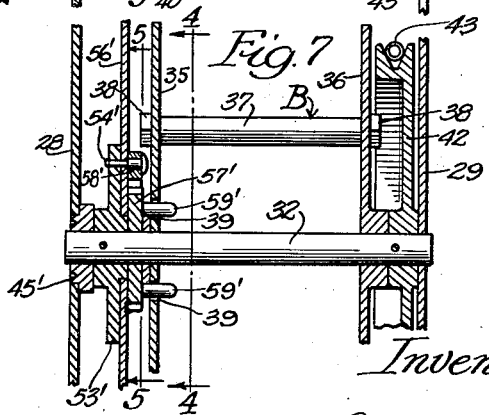

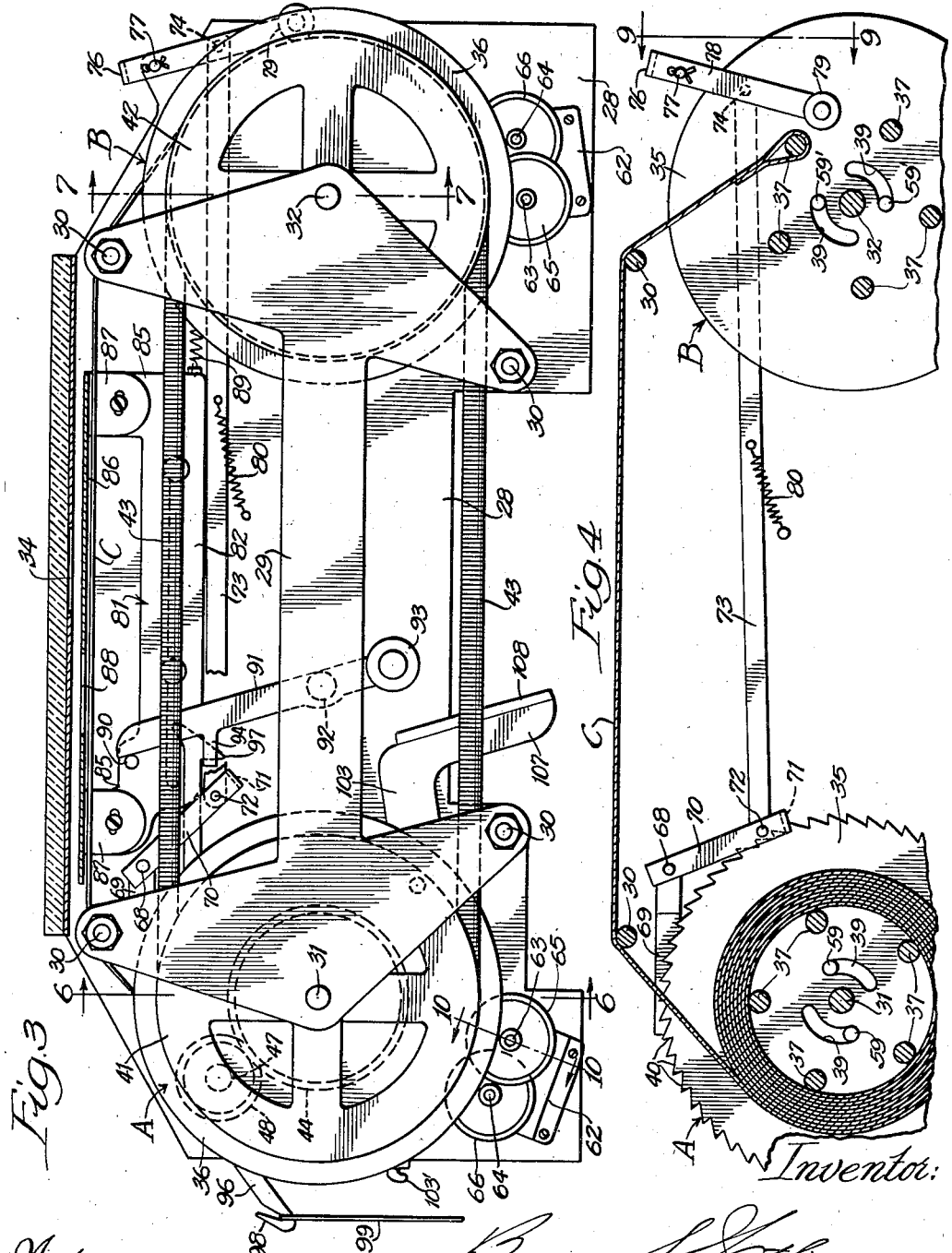

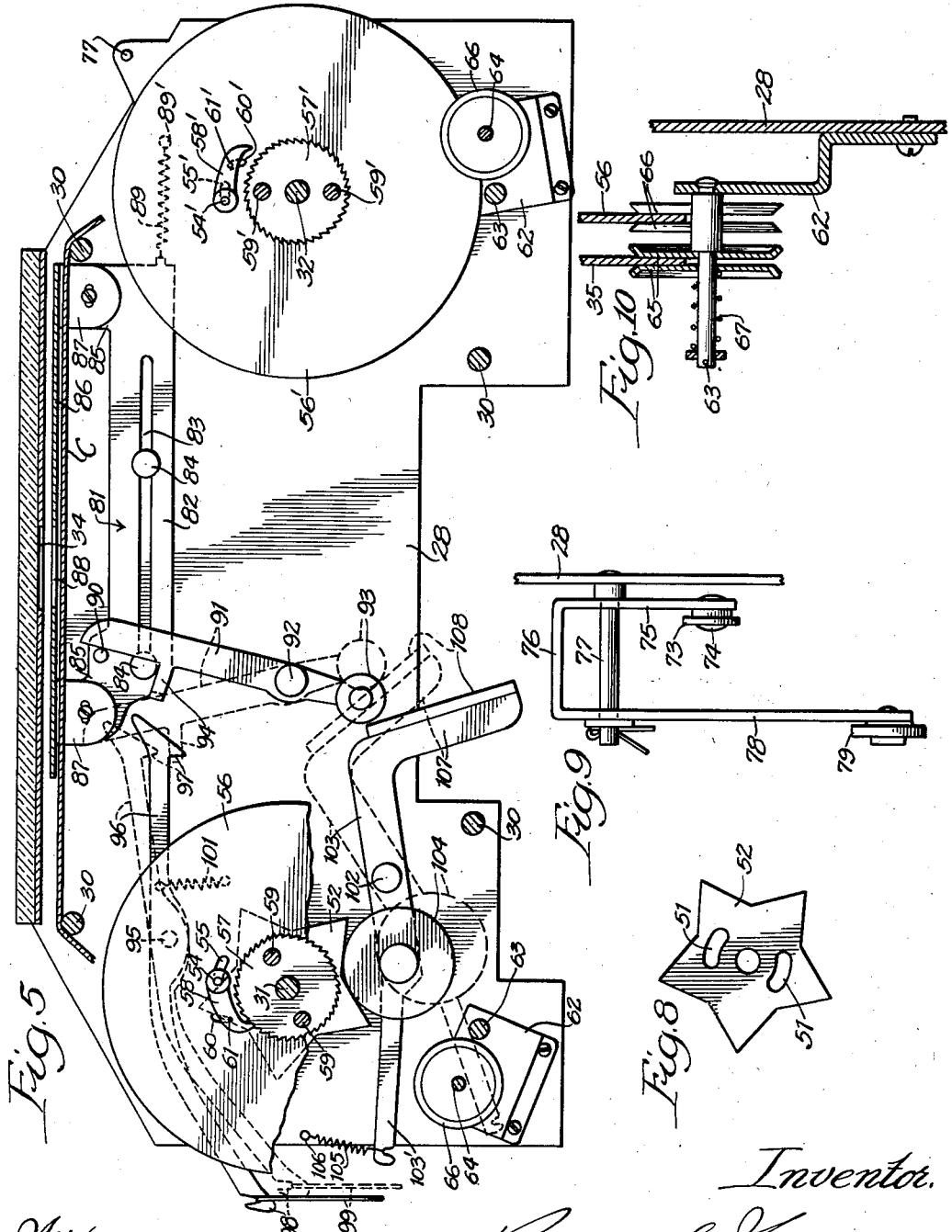

Patented July 26, 1938

2,124,838

UNITED STATES PATENT OFFICE 2,124,838

COIN CONTROLLED AMUSEMENT APPARATUS

Burns S. Watling, Chicago, Ill., assignor to Watling Scale Company, Chicago, Ill., a corporation of Illinois Application April 30, 1938, Serial No. 205,218

18 Claims. (Cl. 40—28)

This invention pertains to coin controlled amusement apparatus of a general type disclosed in Letters Patent to Thomas W. B. Watling, No. 1,923,287, granted August 22, 1933. In the said patent a fortune telling mechanism is combined in a single apparatus with a weighing scale, both being controlled by a common coin actuated means.

My present invention relates solely to the coin controlled fortune telling apparatus, although I have herein shown the same combined with a weighing scale substantially identical with that of the aforesaid patent. But the invention may be used independently of any weighing scale, and among the objects of the invention are:—

To provide a fortune telling apparatus or like amusement device of much greater capacity than that of any similar apparatus heretofore known;

To provide improved means for mounting and actuating the band carrying the questions and answers, or other indicia;

To provide an improved automatic means for preventing the application to the band of tension sufficient to rupture it;

To provide improved means for restoring the shutter that controls the answer sight opening and its locking devices to locked position, wherein it covers the answer sight opening;

To provide an improved belt and pulley drive between the two reels on and between which the band is wound.

An illustrative embodiment of the invention is presented in the accompanying drawings, in which—

Fig. 1 is a front elevation of a combined weighing and fortune telling machine, having the front wall of its casing broken out to disclose underlying parts.

Fig. 2 is an enlarged top plan view.

Fig. 3 is an enlarged rear elevation of the operating parts, with the glazed top wall and underlying shutter in longitudinal section, and with the operating parts shown in their locked position, wherein the answer is concealed.

Fig. 4 is a longitudinal vertical section on the line 4—4 of Figs. 6 and 7.

Fig. 5 is a longitudinal vertical section taken on the line 5—5 of Figs. 6 and 7, with the operating parts appearing in full lines in their shifted positions, wherein the answer is exposed.

Figs. 6 and 7 are vertical transverse sections on the lines 6—6 and 7—7 respectively of Fig. 3.

Fig. 8 is a detail of a star wheel cam.

Fig. 9 is a detail, viewed on the line 9—9 of Fig. 4, of a portion of an automatic detent to arrest further rotation of the direct driven winding drum when the band is wholly unwound from the other drum, and Fig. 10 is a sectional detail of a pair of friction drags, taken on the line 10—10 of Fig. 3.

First briefly describing parts that are old and are more fully described in the aforesaid Patent No. 1,923,287, the frame or casing comprises a base 10, an upright portion 11, and an upper portion or cap 12. The scale platform 13 is connected through a rod 14, a yoke 15, and other connections (not shown) to a pair of pivotally suspended pendulum weights (not shown) that counterbalance the weight on the platform and are normally locked against swinging movement by a dogging lever 16 engaged with a ratchet wheel 17. 18 designates the coin chute, across the lower end of which lies one end of a lever 19 pivoted at 20 and carrying on its other end an adjustable counter-weight 21. The lever 20 is delicately poised to close the lower end of chute 18, and when struck by a falling coin, rocks and discharges the coin; and at the same time a loop or eye 22 on the lever strikes a foot 23 on the lower end of a link rod 24 that is suspended from the outer end of lever 16 and passes through the loop or eye 22, thus unlocking the weighing mechanism. The latter, when operated, rotates a scale disc 25, the scale of which is visible through a central opening 26 in the front wall of the casing cap 12.

The amusement or fortune telling apparatus, in which the novel features of the present invention reside, is mounted in the upper rear part of the cap or top portion 12 of the casing. Strongly secured to the inner side of the vertical front wall portion 27 of the cap 12 is a mounting frame for most of the movable parts consisting of a front plate 28, a rear plate 29 parallel with said front plate, and connecting and spacing bolts 30. Journaled in and between the frame plates 28 and 29 are a pair of shafts 31 and 32 on which are loosely mounted a pair of drums preferably in the form of reels designated as entireties by A and B (Fig. 4), and attached at its ends to, and wound back and forth between these drums, is a long flexible band C that also passes over the upper pair of tie bolts 30 which act as guides to define a flat horizontal stretch of the band between them, as shown in Figs. 3, 4 and 5. The band C carries a rear row or series of questions disposed side by side lengthwise of the band which are exposed to view through an elongated opening 33 (Fig. 2) in the top glazed wall of the cap 12, and it also carries a front row or series of answers, each occupying the same space lengthwise of the band as one of the questions, which, as the band is moved, are alined one at a time with a short view opening 34 (Fig. 2) that is laterally opposite the central portion of the question view opening 33.

The drum A is turned by a manually operated knob or crank, and the two drums are interconnected by a belt and pulley drive of special construction (later described), including means by which either drum may function as the winding member and may, through the band, rotate the other drum functioning as the unwinding member, a light friction drag being applied to both drums to keep the band taut; and the driving members of the two drums are drivingly connected to the latter by means which automatically disengages the drive of the unwinding drum as the drive of the winding drum is engaged, so as to take care of the varying angular movements of the two drums as the effective diameters of the latter change when winding the band from one drum onto the other.

Describing the drums, herein shown as having the form of reels, and their driving and frictional retarding devices, and referring first to Figs. 3, 4, 6 and 7, each reel comprises flat disk-shaped heads 35 and 36, and a skeleton body consisting in this instance of a circular group of uniformly spaced rods 37 secured at their ends to the heads by nuts 38. In the heads 35 are formed opposed arcuate slots 39 concentric with the axis of the reel for a purpose later described. The head 35 of reel A has ratchet teeth 40 on its periphery forming part of an automatic detent for arresting further turning of the winding reel when the band has been fully unwound from the other reel to avoid any breaking strain on the band.

Fast on the inner ends of the shafts 31 and 32 are grooved pulleys 41 and 42 connected by an endless belt 43 which in the instance shown consists of an elastic wire coil that is stretched over the pulleys under sufficient tension to develop sufficient friction to drive either reel from the other during normal band winding operations, but will slip on the pulleys when the band has been fully unwound from reel A to prevent a breaking strain being imparted to the band if the winding movement of reel B should be continued beyond that point.

To wind the band in either direction manual power is applied to shaft 31. Referring to Figs. 6 and 3, keyed on the outer end of shaft 31 is a gear 44, the hub of which is journaled in a bearing member 45 secured to the inner side of the frame plate 28. Journaled in the wall 27 of the cap 12 and in a bearing boss 46 (Figs. 2 and 3) is a shaft 47, on the inner end of which is a pinion 48 meshing with and driving the gear 44. On the outer end of shaft 47 is a manually operable knob 49. Mounted in the hub of gear 44 are a pair of pins 50 that extend through arcuate slots 51 (Fig. 8) of a star wheel cam 52 that is journaled on shaft 31 and lies next to the hub of gear 44 and its bearing 45. The pins 50 extend into holes in a pawl-carrier disk 53 that is journaled on shaft 31 next to the cam 52; and mounted in the disk 53 is a pawl shaft 54 that extends through a short arcuate slot 55 (Fig. 5) in a friction disk 56 that is rotatably mounted on the hub of a ratchet 57 journaled on the shaft 31. Pivoted on the inner end of the pawl shaft 54 is a pawl 58, the nose of which is adapted to drivingly engage the ratchet 57. The ratchet 57 in turn carries a pair of short pins 59 that extend through the arcuate slots 39 of the drum head 35. (See Fig. 4.) In the friction plate 56 is formed a cam slot 60 (Fig. 5) that is engaged by a lateral pin 61 on the side of the pawl 58.

In the case of the reel B, the drive of the reel is from the pulley 42 and shaft 32 to the inner head of the drum through a pawl and ratchet lost motion drive very similar to that above described. As shown in Fig. 7, the inner end of shaft 32 is journaled in a bearing 45' mounted on the inner side of the frame plate 28, and pinned to shaft 32 is a pawl-carrier disk 53' in which is mounted a pawl shaft 54' extending through a short arcuate slot 55' in a friction disk 56' (Fig. 5) and having pivoted thereon a pawl 58' adapted to drivingly engage a ratchet 57', this latter carrying a pair of pins 59' extending through the arcuate slots 39 of the adjacent head 35 of the reel B. In the friction plate 56' is a cam slot 60' engaged by a pin 61' carried by the dog 58'.

To render the above described means for throwing the pawls 58 and 58' into and out of working engagement with their respective ratchets 57, 57', it is necessary to apply a friction drag to the friction disks 56, 56'. Also, to maintain the band taut as it is wound back and forth between the two reels, it is necessary to apply a light drag to the unwinding reel. To fulfill these offices, I employ in association with each reel a pair of friction drags which, in the instance shown, take the form of ordinary sewing machine tensions. Referring to Figs. 3 and 10, mounted on a bracket 62 attached to the inner side of the frame plate 28 are a pair of relatively laterally offset shafts 63 and 64 on which are slidably mounted clamp disks 65 and 66 embracing the peripheral portions of the drum head 35 and the friction disk 56, respectively, and pressed into clamping engagement by springs 67.

By reason of the above described drives, each pawl 58 and 58' undergoes a limited bodily movement as its nose is thrown into or out of engagement with its ratchet by the cam slot 60 or 60'; so that, when the winding of the band is reversed, the pawl of the unwinding reel is drawn out of engagement with its ratchet before the pawl of the winding reel is thrown into engagement with its ratchet, thus avoiding any breaking strain on the band. As the band is wound on one reel it idly rotates the other reel, being maintained taut by the friction 65; and the friction drag on the disks 56, 56' by the friction 66 insures the cooperation of the pins 61, 61' and their cam slots 60, 60' in advancing and retracting the pawls.

Since the reel A is positively driven during its band winding movement by and from the knob 49, I have provided an automatic detent device to arrest such band winding movement when the band has been entirely unwound from reel B, in order to prevent possible rupture of the band by a further winding movement of reel A. Referring to Figs. 3, 4 and 9, pivoted at 68 to a bracket 69 on the frame plate 28 is a depending dog 70 having a lateral tooth 71 on its lower end that cooperates with the peripheral ratchet 40 on the head 35 of reel A. Pivoted to the dog 70 at 72 is a link bar 73, the other end of which is pivoted at 74 to the lower end of the shorter depending arm 75 (Fig. 9) of a yoke 76 that is pivotally suspended on a pin 77 mounted in the frame plate 28. On the lower end of the longer depending arm 78 of the yoke is a roller 79 that, as the band unwinds from reel B, rides on the surface of the band roll under the urge of a spring 80; the tooth 71 of dog 70 being held out of engagement with the teeth 40 of the reel head by the engagement of the roller 79 with the unwinding roll of the band on reel B. The instant, however, the roller 79 rides off the end of the band, the spring 80 shifts the parts to the position shown in Fig. 4, wherein the tooth of the dog engages the ratchet teeth 40, which locks reel A against further band winding movement. When the direction of drive of the band is reversed, the rod 37 to which the looped end of the band is attached forces the roller 79 outwardly, and this retracts the dog tooth 71 from the ratchet teeth 40. It is not necessary to apply a similar detent device to the reel B, because that reel is driven by the belt 43, and if the winding movement of the reel B is carried too far, so as to create a pull on band C when the latter can travel no further, belt 43 will slip on the pulleys before the tension on the band is sufficient to rupture the latter.

It will be observed that a reel such as that shown, wherein the body of the reel consists of a circular series of spaced rods, cooperates with a detent or stop of the character above described, whereas a drum having a body presenting a continuous circular surface would not so cooperate, because the roller 79, riding on such a surface, would not allow a quick shift of the dog 70 into locking engagement with the ratchet 40.

Describing next the mechanism by which the answer on the band C underlying the sight opening 34 is normally concealed, and, on the deposit of a coin, may be exposed to view, and referring to Figs. 3 and 5, 81 designates as an entirety a shutter carriage comprising, in the instance shown, a horizontal bar 82 formed with a longitudinal slot 83 by which it is slidably mounted on a pair of studs 84 mounted in the frame plate 28, and a pair of short uprights 85 on the ends of the bar 82. A flat shutter plate 86 is adjustably supported on the uprights 85 by means of depending legs 87 having screw and slot connection to the uprights 85 by which a limited endwise adjustment of the shutter plate 86 relative to its carriage can be made to secure accurate relation to the fixed sight opening 34 of a sight opening 88 formed in the shutter plate 86. The shutter plate 86 directly overlies the upper lap of the band C, and in the retracted position of the shutter mechanism the opening 88 is out of register with the opening 34 so that the answer underlying the opening 34 is then covered by a solid portion of the shutter plate 86. In the advanced position of the shutter mechanism shown in Fig. 5, the two openings 34 and 88 are in exact register. A pull spring 89 attached to one end of the carriage 81 and anchored to a pin 89' in the plate 28, urges the shutter carriage to the advanced position shown in Fig. 5 wherein the sight openings 34 and 88 are in register. On the upright 85 at the other end of the bar 82 is a pin or lug 90 that is engaged by the upper end of a lever 91, the function of which lever is to push the shutter carriage when the knob 49 is turned in either direction, from its advanced or unlocked position (Fig. 5) to its retracted or locked position (Fig. 3). This lever 91 is mounted on a pivot stud 92 projecting from the frame plate 28, and on its lower end is a roller 93. On one edge of the lever 91 is a laterally extending catch hook 94.

Pivoted at 95 (Fig. 5) on the frame plate 28 is a latch lever 96, the inwardly extending arm of which is formed with a hook 97 that, as shown in Fig. 3, is engaged with the catch hook 94 to lock the shutter carriage in the retracted position shown in Fig. 3 against the pull of its spring 89. The outer end of lever 96 is formed as a hook 98 that receives the upper end of a link 99, the lower end of said link being connected, as shown in Fig. 1, to a bracket 100 on the outer end of the latch lever 16. The latch lever 96 is normally urged to locking position behind the catch hook 94 by a pull spring 101 (Fig. 5), which normally maintains the hooks 97 and 94 engaged with each other. When a coin is deposited in the chute 18 and rocks the lever 19, the links 24 and 99 are drawn downwardly, tilting the latch lever 96 to the release position shown in Fig. 5. The spring 89 then acts to draw the shutter carriage to the position shown in Fig. 5 wherein the shutter opening 88 directly underlies the sight opening 34 so that the answer on the band is then visible through both openings; the desired question having been previously brought to view at the center of the opening 33 by manipulation of the band winding mechanism.

The shutter carriage is returned to its retracted or locked position (Fig. 3) through the following described mechanism, actuated by the star-shaped cam 52. Pivoted on a stud 102 (Fig. 5) mounted in the frame plate 28 is a lever 103 on one arm of which is mounted a roller 104 normally engaged with the periphery of the cam 52 under the pull of a light spring 105 anchored at 106 to the plate 28 and at its other end connected to an extension 103' of the lever 103 beyond the roller 104. On the other arm of the lever 103 is a downwardly inclined extension 107 equipped with a shoe 108 lying in the plane of the roller 93 on the lower end of lever 91. With the parts in the full line position shown in Fig. 5, when the operating knob 42 is turned in either direction, the star cam 52 is rotated carrying one of the two peaks thereof lying nearest to the roller 104 into radial alinement with the roller 104, which rocks lever 103 to the dotted line position shown in Fig. 5, thus swinging lever 91 to the dotted line position shown in Fig. 5 until the catch hook 94 cams under the inclined nose of the hook 97 and automatically engages with the latter under the pull of spring 101, thus restoring the shutter carriage to its retracted and locked position shown in Fig. 3. As soon as the peak of the cam 52 has passed dead center on the roller 104, the pressure of the latter on the cam continues the rotative movement of the cam in the same direction until the roller 104 is centered between two adjacent peaks of the cam; this being permitted by the described lost motion connection of the cam 52 to its drive (pins 50). The cam 52, of course, acts the same on the shutter carriage retracting mechanism when turned in either direction.

A cycle of operation of the apparatus may be briefly described as follows:

With the parts in the unlocked and shifted position shown by full lines in Fig. 5 (which is the position in which the parts have been left by its previous operation), the next person using the apparatus stands on the platform and first, by turning the knob 49 rotates the cam 52 (in one direction or the other) and, through the mechanism last above described, returns the shutter to retracted and locked position (Fig. 3), wherein the answer opening 34 is occluded by the shutter plate. Continued turning of the knob to any extent in either direction starts the band movement and brings the desired question opposite the then closed answer opening without disturbing the set position of the parts as shown in Fig. 3. Said next person then drops a coin in the chute. This releases the weight indicating mechanism by tilting the weight detent lever 16 out of engagement with the ratchet wheel 17, thus showing the user his weight, and at the same time by drawing down the links 24 and 99 tilts the latch lever 96 to the dotted line position shown in Fig. 5, releasing the shutter carriage, and the spring 89 then shifts the shutter carriage to the right, viewing Fig. 5, and brings the answer opening 88 in the shutter plate 86 into register with the fixed sight opening 34 in the top wall of the cap, so that the answer is visible. As soon as the coin is discharged from the chute, the counter-weight 21 tilts lever 19 back into engagement with the lower end of the chute, and as the carriage moves to the right from the position shown in Fig. 3 to that shown in Fig. 5, the spring 101 returns the latch lever 96 to its normal position (shown by full lines in Fig. 5) and this in turn raises links 99 and 24 back to normal position, the return movement of lever 96 being limited by the reengagement of lever 16 with ratchet 17. The same movement of the carriage to the right through pin 90 rocks the lever 91 to the full line position shown in Fig. 5, wherein its roller 93 is in position to be engaged by the shoe 108 of lever 103, at the beginning of the next cycle.

The lost motion drive between the ratchets 57, 57' and their respective reels (represented by the pins 59 and 59' and the arcuate slots 39 in the reel heads) is not indispensable to the operativeness of the apparatus, but is preferably employed because it delays the band movement until after the answer opening has been fully occluded by the movement of the shutter to its retracted and locked position, so that no free answers to new questions are obtainable.

Although but one specific embodiment of this invention has been herein shown and described, I wish it to be understood that details of the constructions shown may be altered without departing from the principle of the invention as defined by the appended claims.

I claim:

1. In an apparatus of the class described, the combination with a casing, of a pair of drums mounted in said casing, a band attached at its ends to the respective drums and adapted to be wound back and forth between said drums, said band bearing a series of questions and answers, manually operable means for turning one of said drums, means other than said band for transmitting the movement of said manually operable means to the other drum, a shutter movable to expose an answer, and means for restoring said shutter.

2. In an apparatus of the class described, the combination with a casing, of a pair of drums mounted in said casing, a band attached at its ends to the respective drums and adapted to be wound back and forth between said drums, said band bearing a series of questions and answers, manually operable means for turning one of said drums, means other than said band for transmitting the movement of said manually operable means to the other drum, a shutter, a spring urging said shutter to a position to expose an answer, and means actuated by said manually operable means for restoring said shutter.

3. In an apparatus of the class described, the combination with a casing, of a pair of drums mounted in said casing, a band attached at its ends to the respective drums and adapted to be wound back and forth between said drums, said band bearing a series of questions and answers, manually operable means for turning one of said drums, belt and pulley means for transmitting the turning movement of said manually operable means to the other drum, a shutter movable to expose an answer, and means actuated by said manually operable means for restoring said shutter.

4. In an apparatus of the class described, the combination with a casing, of a pair of drums mounted in said casing, a band attached at its ends to the respective drums and adapted to be wound back and forth between said drums, said band bearing a series of questions and answers, manually operable means for turning one of said drums, belt and pulley means for transmitting the turning movement of said manually operable means to the other drum, a shutter movable to expose an answer, a cam actuated by said manually operable means, and means actuated by said cam for restoring the shutter.

5. In an apparatus of the class described, the combination with a casing, of a pair of shafts rotatably mounted in said casing, a pair of drums rotatable on said shafts, a band attached at its ends to, and adapted to be wound back and forth between, said drums, a drive connecting said shafts, manually operable means for rotating one of said shafts in either direction, a one-way disconnective drive from said manually operable means to one of said drums, and a one-way disconnective drive from the other shaft to the other drum, said one-way drives turning their respective drums in opposite directions and the drive of the unwinding drum being disconnected before the drive of the winding drum is connected.

6. In an apparatus of the class described, the combination with a casing, of a pair of shafts rotatably mounted in said casing, a pair of drums rotatable on said shafts, a band attached at its ends to, and adapted to be wound back and forth between, said drums, a drive connecting said shafts, manually operable means for rotating one of said shafts in either direction, a one-way disconnective drive from said manually operable means to one of said drums, a one-way disconnective drive from the other shaft to the other drum, said one-way drives turning their respective drums in opposite directions and the drive of the unwinding drum being disconnected before the drive of the winding drum is connected, and means for applying a drag to each drum for maintaining taut the portion of the band extending between said drums.

7. In an apparatus of the class described, the combination with a casing, of a pair of shafts rotatably mounted in said casing, a pair of drums rotatable on said shafts, a band attached at its ends to, and adapted to be wound back and forth between, said drums, a drive connecting said shafts, manually operable means for rotating one of said shafts in either direction, a pawl and ratchet drive from said manually operable means to one of said drums, a pawl and ratchet drive from the other shaft to the other drum, said pawl and ratchet drives turning their respective drums in opposite directions, and means for disengaging the pawl and ratchet of the unwinding drum before the pawl and ratchet of the winding drum are engaged.

8. In an apparatus of the class described, the combination with a casing, of a pair of shafts rotatably mounted in said casing, a pair of drums rotatable on said shafts, a band attached at its ends to, and adapted to be wound back and forth between, said drums, a drive connecting said shafts, manually operable means for rotating one of said shafts in either direction, a pawl and ratchet drive from said manually operable means to one of said drums, a pawl and ratchet drive from the other shaft to the other drum, said pawl and ratchet drives turning their respective drums in opposite directions, means for disengaging the pawl and ratchet of the unwinding drum before the pawl and ratchet of the winding drum are engaged, and a spring actuated friction drag device applied to each drum for maintaining taut the portion of the band extending between said drums.

9. In an apparatus of the class described, the combination with a band winding and unwinding drum and a shaft on which said drum is rotatably mounted, of manually operable lost motion means for imparting a winding movement to, and permitting an unwinding movement of, said drum comprising a rotatable member mounted on said shaft, means for turning said member, a friction plate mounted on said shaft and having an arcuate slot and a cam slot, a pivot shaft mounted on said member and extending through said arcuate slot, a pawl pivoted on the free end of said pivot shaft, a ratchet journaled on said shaft beneath said pawl, a pin mounted in said pawl and engaged with said cam slot, a driving connection between said ratchet and said drum, and a friction drag device applied to said friction plate, whereby, when said rotatable member is turned in one direction said pawl is lifted by said cam slot and pin out of engagement with said ratchet, and when said rotatable member is turned in the other direction said pawl is forced by said cam slot and pin into engagement with said ratchet.

10. An embodiment of claim 9 wherein the driving connection between the ratchet and the drum is a lost motion connection consisting of a pin mounted in said ratchet and extending through an arcuate slot in a head of the drum, and a friction drag device is applied to the drum.

11. In an apparatus of the class described, the combination with rotatable winding and unwinding drums, and a band attached at its ends to, and extending between, said drums, of manually operable means for rotating said winding drum, a detent device, and means automatically throwing said detent device into engagement with said winding drum to arrest the winding movement thereof when said band has been fully unwound from said unwinding drum.

12. In an apparatus of the class described, the combination with rotatable winding and unwinding drums, and a band attached at its ends to, and extending between, said drums, of manually operable means for rotating said winding drum, a ratchet fast with said winding drum, a dog shiftable into and out of engagement with said ratchet, and means controlled by said unwinding drum automatically throwing said dog into engagement with said ratchet when said band has been fully unwound from said unwinding drum.

13. In an apparatus of the class described, the combination with rotatable winding and unwinding reels, and a band attached at its ends to and extending between said reels, of manually operable means for rotating said winding reel, a ratchet fast with said winding reel, a dog shiftable into and out of engagement with said ratchet, a roller mounted to ride on the surface of the unwound roll of the band on said unwinding reel, a link connecting said dog to said roller, and a spring urging said link in a direction to cause said dog to engage said ratchet as said roller rides off the end of said band on said unwinding reel.

14. In an apparatus of the class described, the combination with a casing, of a pair of shafts rotatably mounted in said casing, a pair of reels rotatable on said shafts, a band attached at its ends to, and adapted to be wound back and forth between, said reels, manually operable means for rotating one of said shafts in either direction, a one-way disconnective drive from said manually operable means to the reel nearest thereto, a one-way disconnective drive from the other shaft to the other reel, said one-way drives turning their respective reels successively in opposite directions, a belt and pulley drive connecting said shafts, said belt adapted to slip on its pulleys before a breaking tension is applied to said band, a circular ratchet fast with the reel nearest said manually operable means, a dog shiftable into and out of engagement with said ratchet, and means controlled by the other reel automatically throwing said dog into engagement with said ratchet when said band has been fully unwound from said other reel.

15. A specific embodiment of claim 14 wherein the belt and pulley drive consists of grooved pulleys fast on the shafts, and an elastic wire coil belt stretched over said pulleys.

16. In an apparatus of the class described, the combination with a casing having a sight opening in a wall thereof, a pair of drums mounted in said casing, a band extending between said drums and carrying indicia visible through said opening, and means for turning said drums, of a shutter carriage slidably mounted in said casing and carrying a shutter overlying said band, said shutter having an opening shiftable into and out of register with said sight opening under sliding movements of said shutter, a spring urging said shutter carriage in a direction to register said openings, a lever pivoted on a wall of said casing, a lug on said carriage engaged with one end of said lever under the pull of said spring, a second lever pivoted on a wall of said casing with one arm thereof so located as to engage said first named lever and tilt the latter in a direction to shift said carriage against the pull of its spring, a manually operable cam engaged with said second lever, a catch on said first named lever, and a latch lever having a hook automatically engaging with said catch when said carriage is shifted by said cam and levers.

17. A specific embodiment of claim 16, wherein the cam is a star-shaped cam, and the second lever is equipped with a roller and a spring for causing said roller to hug the periphery of said cam.

18. A specific embodiment of claim 16, wherein the cam is a star-shaped cam, and the second lever is equipped with a roller and a spring for causing said roller to hug the periphery of said cam, and wherein the manually operable means for turning the cam forms a part of the drum turning means and includes lost motion means permitting the cam-engaging roller to automatically center itself between adjacent peaks of the cam.

BURNS S. WATLING.